United States Patent [19]

Tanaka

[11] 4,224,912
[45] Sep. 30, 1980

[54] EXHAUST GAS RECIRCULATION SYSTEM WITH AN AUXILIARY VALVE

[75] Inventor: Masaaki Tanaka, Susono, Japan

[73] Assignee: Toyota Jidosha Kogyo Kabushiki Kaisha, Toyota, Japan

[21] Appl. No.: 39,610

[22] Filed: May 16, 1979

[30] Foreign Application Priority Data

Aug. 2, 1978 [JP] Japan .................................. 53-94240

[51] Int. Cl.³ .............................................. F02M 25/06
[52] U.S. Cl. .................................................... 123/568
[58] Field of Search ..................................... 123/119 A

[56] References Cited

U.S. PATENT DOCUMENTS

| | | | |
|---|---|---|---|
| 3,621,825 | 11/1971 | Ojala | 123/119 A |
| 3,675,633 | 7/1972 | Nakajima et al. | 123/119 A |
| 3,882,837 | 5/1975 | Horie et al. | 123/119 A |
| 3,934,564 | 1/1976 | Barnert | 123/119 A |
| 4,071,003 | 1/1978 | Aono | 123/119 A |
| 4,147,143 | 4/1979 | Harada | 123/119 A |
| 4,170,973 | 10/1979 | Nohira et al. | 123/119 A |
| 4,174,027 | 11/1979 | Nakazumi | 123/119 A |

*Primary Examiner*—Wendell E. Burns
*Attorney, Agent, or Firm*—Finnegan, Henderson, Farebow, Garrett & Dunner

[57] ABSTRACT

In an internal combustion engine which incorporates an exhaust gas recirculation system which has an exhaust gas recirculation flow control valve provided at a middle position of the exhaust gas recirculation passage, the control valve being operated depending upon comparison between target and actual values of a control parameter with regard to the amount of exhaust gas recirculation, an auxiliary valve is provided in the exhaust gas recirculation passage in series with the exhaust gas recirculation flow control valve so as to control the cross-sectional area of the exhaust gas recirculation passage in accordance with the opening amount of the throttle valve provided in the intake passage of the engine.

5 Claims, 3 Drawing Figures

EXHAUST GAS RECIRCULATION SYSTEM WITH AN AUXILIARY VALVE

BACKGROUND OF THE INVENTION

The present invention is concerned with exhaust gas recirculation in internal combustion engines, and more particularly is concerned with a control system for controlling the quantity of exhaust gas recirculation which is effected during the operation of an internal combustion engine. In particular, the present invention concerns a refinement of a control means of the electronic type for exhaust gas recirculation.

As a method of reducing the concentration of NOx in the exhaust gases of an internal combustion engine, exhaust gas recirculation, which involves recirculating a part of the exhaust gases from the exhaust passage of the engine into the intake passage or intake manifold, is often practiced; and it is a valid way for performing such purification. However, there is a tendency for this exhaust gas recirculation to have a harmful effect on the output power of the engine, and also there is a danger that the fuel economy of the engine, and its drivability, if incorporated in a vehicle, may be deteriorated.

In general, from the point of view of ensuring overall satisfactory performance of an internal combustion engine, from the point of view of power output, fuel consumption, and driveability, the best performance of providing exhaust gas recirculation is one which provides a fixed ratio of exhaust gas which is recirculated, compared to the intake amount of air taken in through the inlet of the carburetor or the like to the engine.

Thus, in order to perform exhaust gas recirculation in the best possible way, an exhaust gas recirculation control means is required, which regulates the amount of exhaust gas recirculated, in response to variation of the operating conditions of the engine.

One such exhaust gas recirculation control means which has already been proposed, and practiced, has an exhaust gas recirculation flow control valve which by its opening and closing operation controls the amount of exhaust gas flowing through an exhaust gas recirculation passage, and is opened or closed in accordance with the amount of vacuum supplied to its vacuum chamber, a changeover valve which selectively connects the vacuum chamber of said control valve to a vacuum source or the atmosphere, and a computing controller which compares the vacuum in said vacuum chamber or valve lift of said control valve with a preset target value and changes over said changeover valve so that the actual vacuum in said vacuum chamber or the valve lift of said control valve is maintained in the close vicinity of the target value.

In such an exhaust gas recirculation control means the computing controller compares the actual value of vacuum existing in the vacuum chamber of, or, alternatively, the current amount of valve lift of, said exhaust gas recirculation flow control valve, with the target value in synchronization with clock pulses, and generates an ON/OFF signal or a pulse signal having a duty ratio which changes in accordance with the result of the comparison, said signal being supplied to said changeover valve. Therefore, the computing controller delivers an ON/OFF signal or a varying duty ratio signal of a frequency which corresponds to the frequency of the clock pulse signal, and the changeover valve is changed over at this frequency.

In this case, if, during the time between one clock pulse signal and the next, the driving condition of the engine changes, so that the target value is changed, then when the next clock pulse signal occurs the comparison between the new target value and the actual value of vacuum in the vacuum chamber, or the amount of valve lift, of said exhaust gas recirculation flow control valve is performed, and according to the result of this comparison the changeover valve is controlled so as to make said actual value come closer to the new target value. However, in the interval before the next clock pulse signal occurs, after the change in the driving condition of the engine, exhaust gas recirculation is performed in an amount suitable to the previous engine driving condition, and therefore, in the meantime, before the next clock pulse signal occurs, exhaust gas recirculation is not performed in an exactly correct amount. Therefore, an approximation error exists in this form of control.

If the frequency of the clock signal is made higher, of course this approximation error is diminished, and therefore the accuracy of the exhaust gas recirculation amount is increased. However, as the frequency of this clock pulse signal is increased, the problem arises that the changeover valve, which has to respond to signals of the same frequency as this clock pulse signal, suffers as regards its durability. Thus in practice, the expedient of increasing the frequency of the clock pulse signal is limited in its application. The frequency practically usable at the present time, with present changeover valves of current design, is only about 10 Hz, approximately.

Further, in this case, there exist a time delay caused by the sluggish movement of the fluid whose pressure is operating in the vacuum chamber of the exhaust gas recirculation flow control valve, before the vacuum therein has been accorded, according to the operation of the changeover valve, to the proper value for providing proper exhaust gas recirculation performance, and a time delay in which the vacuum in the vacuum chamber or the amount of valve lift of the exhaust gas recirculation flow control valve is detected and compared with the target value, and a control signal is given to said exhaust gas recirculation flow control valve and these time delays adversely affect exhaust gas recirculation being performed in an amount suitable to the current driving condition of the vehicle.

In general, the recirculating quantity Q of exhaust gas, in an exhaust gas recirculation system, is determined by the following formula:

$$Q = CA \times \sqrt{(2g/r) \times abs(Pe - Pi)}$$

Here:
C is a coefficient of flow amount;
A is the passage area in the exhaust gas recirculation passage defined by the exhaust gas recirculation flow control valve;
g is gravitational acceleration;
r is the gas specific gravity;
Pe is the exhaust gas pressure in the exhaust system; and
Pi is the pressure in the intake manifold.

Since the memory of the computing controller remembers target values which represent the passage area A of the exhaust gas recirculation flow control valve which will provide the most desirable amount of exhaust gas recirculation, and which change according to the current value of abs(Pe-Pi), which in turn changes according to the current operating conditions of the engine, if no approximation error, such as due to the aforementioned time delays, existed, then the exhaust gas recirculation flow control valve would always be set up to provide the correct passage area A; but in fact, as such an error always will exist, the passage area which is set up in the exhaust gas recirculation flow control valve is not always correct.

If the error in the passage area A of the exhaust gas recirculation flow control valve is the same, it will be noted that, the greater is the value of abs(Pe-Pi), the greater is the error in the amount Q of exhaust gas recirculation.

Further, since in low load driving, the most desirable amount of exhaust gas recirculation Q is small, the error in the amount Q is more noticeable, in proportion to the actual value of Q. Therefore, in low load and decelerating operation of the engine, the approximation error, which, as explained above, is inevitable, can cause a serious problem with regard to exhaust gas quality and engine performance.

Further, when the exhaust gas recirculation flow control valve is manufactured, in view of cost, to have a valve element formed as a simple cone-shaped element, the smaller valve lift is, i.e. the lower the load of the engine is, the greater is the rate of change of the opening area of the control valve, relative to the lift of the valve element, and therefore, the ratio of the approximation error in the amount of exhaust gas recirculation is greater in low load operation than in high load operation.

SUMMARY OF THE INVENTION

In view of the problems outlined above, it is an object of the present invention to provide an exhaust gas recirculation control means of the electronic type which is synchronized to clock pulse control signals and which provides the properest amount of exhaust gas recirculation, reducing the error therein as much as possible, especially in low load and overrun operation of the engine.

This purpose, according to the present invention, is attained by an exhaust gas recirculation control system for an engine which has an intake passage which incorporates a throttle valve, and an exhaust passage, comprising an exhaust gas recirculation passage which joins between said exhaust passage and said intake passage, means to detect engine operating parameters, an exhaust gas recirculation flow control valve, provided at a middle portion of said exhaust gas recirculating passage, so as to control the cross-sectional area of said exhaust gas recirculation passage according to a control signal, a computing controller comprising a memory means which is adapted to store target values of a control parameter corresponding to opening amounts of said exhaust gas recirculation flow control valve which provide the most desirable amounts of exhaust gas recirculation under various engine operating conditions determined by combinations of said engine operating parameters, wherein said computing controller computes the target value of said control parameter based upon said engine operating parameters and compares said target value with the actual value of said control parameter and based thereupon produces said control signal, and an auxiliary valve located in said exhaust gas recirculation passage which is linked with said throttle valve and controls the cross-sectional area of said exhaust gas recirculation passage in relation to the opening amount of said throttle valve.

This regulating valve means, which is linked to the operation of the throttle valve, squeezes almost shut the exhaust gas recirculation passage, when the throttle valve is at or near the idling opening, and, as the throttle valve is more and more opened, the regulating valve opens more and more. This valve means may be constructed so as to reach its full open position when the throttle has reached its full open position, or before then. As another possibility, the said regulating valve means may be constructed so as to start opening later than the throttle valve, so that it remains closed until the throttle valve has opened to more than a predetermined amount. Thus, in this case, when the throttle is full open, the regulating valve means may be open, for example, to or past the halfway position. Various performances of opening of the regulating valve means may be provided, in different embodiments of the present invention, according to circumstance.

By the provision of the said regulating valve means, in low load or overrun operation of the engine, when the throttle is nearly closed, and accordingly the inlet mainfold pressure Pi is very low, the pressure on the downstream side of the said exhaust gas recirculating flow control valve is raised, due to the constricting effect of the said regulating valve means, because it, too, is nearly closed, and thereby the value of abs(Pb-Pi), i.e. of the pressure difference between the upstream side and the downstream side of the said exhaust gas recirculation flow control valve, is reduced, and therefore, for the same recirculating amount Q of exhaust gas required, the cross-sectional area A is increased. Therefore the sensitivity to approximation error of the system is greatly reduced. Of course, in such a system, different sets of values representing the cross-sectional area A will be memorized in the memory means from those in a conventional system. In short, by the provision of this regulating valve means, the exhaust gas recirculation flow control valve may be operated for much more of its time in its region of larger opening, which is the region of greater accuracy of exhaust gas recirculation amount, and accordingly the efficiency of purification of exhaust gases of the engine is improved.

BRIEF DESCRIPTION OF THE DRAWINGS

The present invention will become more clearly understood from the following description of several preferred embodiments, and from the drawings, which, however, are given for the purposes of illustration only, and are not by any means to be taken as being limitative of the scope of the present invention. In these drawings.

DETAILED DESCRIPTION OF THE PREFERRED EMBODIMENTS

Figures 1, 2:
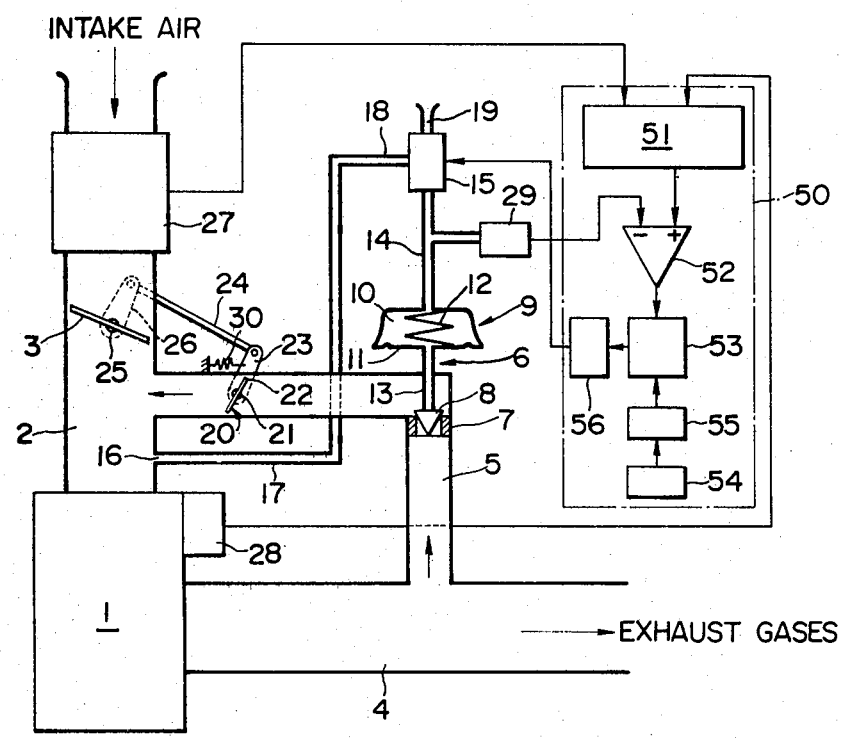
FIG. 1 is a diagrammatical illustration of a first embodiment of the exhaust gas recirculation control system of the present invention, wherein the position of a valve element of an exhaust gas recirculation flow control valve is detected by a vacuum sensor.
FIG. 2 is an enlarged illustration of the construction of a regulating valve device in another embodiment of the exhaust gas recirculation control means of the present invention, which is provided with an adjusting screw.

Referring to FIG. 1, there is shown in somewhat diagrammatical form a first preferred embodiment of the present invention. An engine of a vehicle, shown diagrammatically by 1, takes in air or air/fuel mixture as the case may be from an intake passage 2, the amount of flow of said intake gas being regulated by a throttle valve 3, and discharges exhaust gases into an exhaust passage 4. Part way along the exhaust passage 4 an exhaust gas recirculation passage 5 branches off, and this exhaust gas recirculation passage 5 leads a part of the exhaust gases back to the intake passage 2. At a middle portion of the exhaust gas recirculation passage 5 the exhaust gas recirculation flow control valve 6 is provided.

The exhaust gas recirculation flow control valve 6 has a cone shaped flow control valve element 8 which controls the effective opening of the flow control valve port 7 which is provided at a point middle portion of the exhaust gas recirculation passage 5, and further has a flow control valve diaphragm mechanism 9 which controls the motion of the flow control valve element 8. When vacuum larger than a predetermined value is not present in the diaphragm chamber 10 of this flow control valve diaphragm mechanism 9, then the flow control valve diaphragm 11 is pushed downwards in the figure by the action of a compression coil spring 12, and this pushes, via the valve rod 13, the flow control valve element 8 fully against the flow control valve port 7, closing it completely. Conversely, on the other hand, when more than the predetermined value of vacuum is present in the diaphragm chamber 10 of this flow control valve diaphragm mechanism 9, then this vacuum pulls the flow control valve diaphragm 11 upwards in the figure against the action of the compression coil spring 12, and this, separating the flow control valve element 8 from the flow control valve port 7, opens it; and, the greater grows the vacuum in the diaphragm chamber 10, the higher the flow control valve element 8 is lifted in the figure against the action of the compression coil spring 12, and thus gradually the cross-sectional area of the opening of the flow control valve port 7 is increased.

The diaphragm chamber 10 of the exhaust gas recirculation flow control valve 6 is connected to an electromagnetic type changeover valve 15 through a conduit 14. This changeover valve is provided with a low pressure port 18 which is connected by a vacuum conduit 17 to an intake vacuum port 16 which opens in the intake passage 2 at a position which is absolutely downstream of the throttle valve 3. Further, the changeoer valve is provided with a release port 19 which is open to the atmosphere. When power is supplied to the electromagnetic chnageover valve 15 the diaphragm chamber 10 of the exhaust gas recirculation flow control valve 6 is connected to the intake vacuum port 16, but when on the other hand power is not supplied to the electromagnetic changeover valve 15 the diaphragm chamber 10 of the exhaust gas recirculation flow control valve 6 is connected to the release port 19, i.e. to the atmosphere. By rapidly changing over this changeover valve 15 to and fro between its two states, the vacuum from the intake passage 2 is modified so that the correct vacuum level is maintained in the diaphragm chamber 10 of the exhaust gas recirculation flow control valve 6. The power supply for controlling this changeover valve 15 is provided from the computing controller 50, which will be explained hereinafter.

At a middle portion of the exhaust gas recirculation passage 5, downstream from the exhaust gas recirculation flow control valve 6, is provided a regulating valve 20, which controls the cross-sectional area of this exhaust gas recirculation passage 5. This regulating valve 20 comprises a circular plate-like valve flap element 22 supported on an axle 21, and as the axle 21 rotates the valve flap element 22 rotates to open and shut the exhaust gas recirculation passage 5, in a manner similar to the manner of operation of a usual throttle butterfly valve. Further, on the axle is attached the lever 23, and to the end of this lever 23 is attached one end of a link rod 24. The other end of this link rod 24 is attached to the end of a lever 26 which is fixed to the throttle axle of the throttle valve 3.

By this arrangement, the valve flap element 22 opens and shuts the exhaust gas recirculation passage 5 in accordance with the operation of the throttle 3. For example, when the throttle 3 is in the idling position, as shown in the figure, the valve flap element 22 is in a position so as nearly completely to close the cross-sectional area of the exhaust gas recirculation passage 5, and as the throttle valve 3 opens, the exhaust gas recirculation passage 5 is opened, until when the throttle 3 is fully opened the exhaust gas recirculation passage 5 is also fully opened.

Further, to absorb any play in the linked system, the lever 23 is biased in the anticlockwise direction in FIG. 1 by an antirattle spring 30.

As another possibility, the driving part of the regulating valve 20 may be made as shown in FIG. 2. In this alternative embodiment, the lever 23 is supported on the axle 21 freely, so that it may rotate thereon. A lug 23' of the lever 23 abuts against the adjusting screw 32, which is threaded into a stop lever 31, the other end of the stop lever 31 being fixed to the axle 21. Further, the stop lever 31 is biased in the anticlockwise direction in the figure by a tension coil spring 33. Therefore, when the lever 23 is driven clockwise in the figure by the link rod 24, which is reacting to the opening of the throttle 3, the stop lever 31 rotates with it and opens the valve flap element 22. In this arrangement, by turning the adjusting screw 32, the position of the valve flap element 22 can be adjusted with respect to the position of the throttle valve 3.

Now the operation of the computing controller 50 will be described.

The computing controller 50 contains a memory means 51, which may be a programmable read-only memory. This memory means 51 remembers electric values which correspond to the vacuum values in the diaphragm chamber 10 of the exhaust gas recirculation flow control valve 6 which correspond to the most desirable amounts of recirculating exhaust gas, as determined in view of the current values of engine rotational speed and amount of intake air flow, which are taken as the operating parameters of the engine. These electric values therefore, in the particular circumstances of the operating parameters of the engine, correspond to target values for the vacuum amount in the diaphragm chamber 10 of the exhaust gas recirculation flow control valve 6. By these target values being decided, the amount of opening of the exhaust gas recirculation flow control valve 6 will be decided, and thereby the exhaust gas recirculation will be determined.

These target values are determined beforehand during tests in a laboratory facility with a similar engine on a test bed, in view of minimizing exhaust gas pollution while not deteriorating drivability of the engine or output power thereof. These tests determine optimum values for the vacuum supplied to the diaphragm chamber 10, and these are then converted into electrical values to be memorized in the memory means 51.

The memory means 51 receives input signals from two sources: from an intake air flow sensor 27 which is attached on to the intake system of the engine 1, and which produces an electric signal corresponding to the flow of intake air therethrough, and from an engine rotational speed sensor 28 which is attached to the engine and which generates an electrical signal corresponding to the engine revolution speed. From these two, the memory means 51 produces from its stored values the correct target value of vacuum amount for the diaphragm chamber 10. This value is sent to the subtracter 52, which is also supplied with the electrical signal produced by the vacuum sensor 29, which corresponds to the actual value of vacuum present in the diaphragm chamber 10 of the exhaust gas recirculation flow control valve 6. The subtracter 52 makes a comparison between this target vacuum value signal and this actual vacuum value signal and produces a voltage signal based on the comparison and delivers it to a comparator 53.

The vacuum sensor 29 is attached at a middle portion of the conduit 14 and detects the amount of vacuum present in the diaphragm chamber 10 of the exhaust gas recirculation flow control valve 6. Thus the signal which this vacuum sensor produces is in fact a signal which represents the real opening amount of the exhaust gas recirculation flow control valve 6.

The comparator 53 also receives a triangular wave signal which is produced by changing the waveform of a clock pulse signal produced by a clock pulse generating circuit 54 in a wave-shaping circuit 55, and makes a comparison between this triangular wave signal and the voltage signal which it has received from the subtracter 52. The result of this comparison is a signal of duty ratio based on the comparison as made in the subtracter 52. This signal is sent to the amplifier 56, which amplifies it, and delivers it to the changeover valve 15.

Now, suppose that the engine is operating under a given power generating condition defined by a given combination of intake air flow rate and engine revolution speed. These values are detected by the intake air flow sensor 27 and the engine revolution speed sensor 28 and fed to the memory means 51 of the computing controller 50. This memory means 51 produces a target vacuum value signal, corresponding to these detected values, which defines the most desirable value of exhaust gas recirculation, i.e. the position of the exhaust gas recirculation flow control valve that should be striven for in this engine operational condition. The subtracter 52 compares this target vacuum value signal with the actual value signal of the vacuum in the diaphragm chamber 10 of the exhaust gas recirculation flow control valve 6, as produced by the vacuum sensor 29, and feeds the result of this comparison to the comparator 53. In the case that the actual vacuum value signal is greater than the target value signal, the comparator 53 produces a pulse signal of duty ratio which is comparatively small. On the other hand, when the actual vacuum value signal is less than the target vacuum value signal, the comparator 53 produces a pulse signal of duty ratio which is comparatively large.

According to this pulse signal, via the amplifier 56, the control of the changeover valve 15 is performed, and thus the vacuum supplied to the diaphragm chamber 10 of the exhaust gas recirculation flow control valve 6 is brought more closely to the target value. As a consequence, the opening amount of the exhaust gas recirculation flow control valve 6 is brought more closely to the target opening amount, and therefore the actual amount of exhaust gas recirculation is brought more closely to the predetermined target amount of exhaust gas recirculation.

Of course there is a margin of error in this system, and also there is a time delay which occurs when the driving conditions of the engine change, so that the most desirable amount of exhaust gas recirculation changes, whereby the opening amount of the exhaust gas recirculation flow control valve 6 comes to be different from the ideal amount, before the system can adjust this opening amount so as to correct the degree of exhaust gas recirculation. In this case, however, by the particular operation of the regulating valve 20, especially when the engine is operating in the low load condition, wherein the opening amount of the throttle valve 3 is small, and the opening amount of the regulating valve device 20 is also small, it is avoided that the opening amount of the exhaust gas recirculation control valve 6 becomes too large due to the approximation error and time delay, because the almost-closed regulating valve 20 squeezes almost closed the exhaust gas recirculation passage 5, so that the pressure difference between the upstream and the downstream side of the exhaust gas recirculation flow control valve 6 is reduced to a low value which never causes exhaust gas recirculation of an amount which unduly deteriorates drivability of the engine.

As the throttle valve 3 opens, the valve flap element 22 opens in unison therewith. However, when the opening amount of the throttle valve 3 is large, the manifold vacuum is reduced, and therefore the pressure difference between the upstream side and the downstream side of the exhaust gas recirculation flow control valve 6 is relatively small. Therefore, even through the valve flap element 22 has opened, the amount of exhaust gas recirculation will not grow so large, due to the aforementioned approximation errors and delays, as to deteriorate drivability of the engine.

Figure 3:
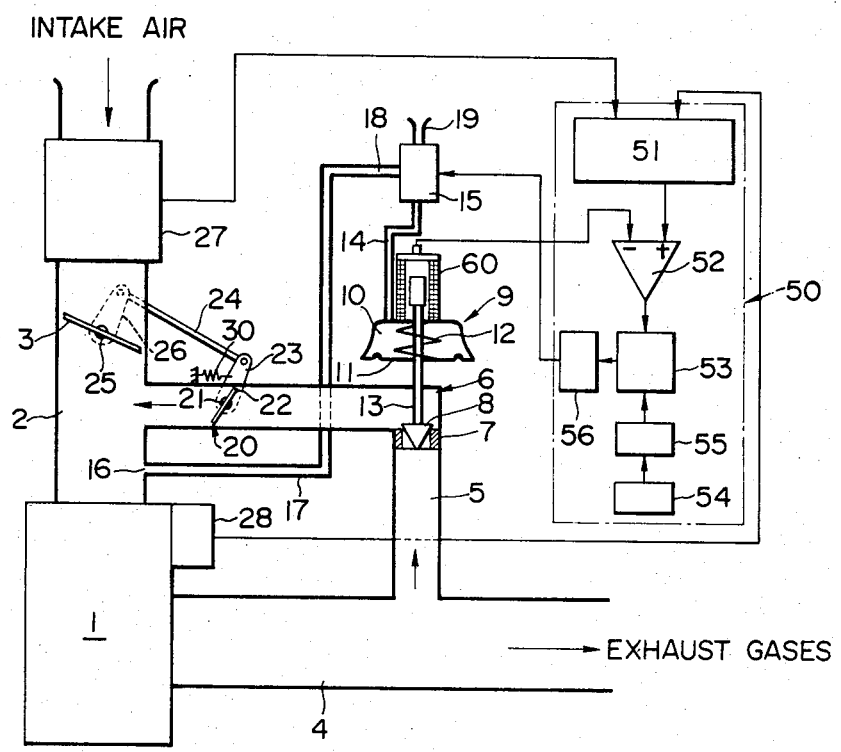
FIG. 3 is a diagrammatical illustration, similar to FIG. 1, of another embodiment of the exhaust gas recirculation control system of the present invention, wherein the position of the valve element of the exhaust gas recirculation flow control valve is detected by a displacement sensing transformer.

FIG. 3 shows another embodiment of the exhaust gas recirculation control device of the present invention. In this embodiment, the amount of opening of the exhaust gas recirculation flow control valve 6 is detected by a displacement sensing transformer 60 which thus monitors the valve lift of the valve 6. In this case, therefore, the memory means 51 of the computing controller 50 remembers target values which correspond to the electric signals delivered by this displacement sensing transformer 60 when the exhaust gas recirculation is at its most desirable level for the particular engine operational conditions, as again determined by the various combinations of intake air flow rate and engine rotational speed. This target value, as delivered from the memory means 51, is sent to the subtracter 52, together with the output of the displacement sensing transformer 60, and this subtracter 52 compares the two and produces a voltage signal based upon this comparison which is supplied to the comparator 53. This comparator, in the same manner as in the previous embodiment, produces a signal of duty ratio which depends upon the result of this comparison performed by the subtracter 52, and this signal, amplified by the amplifier 56, is sent to the changeover valve 15. It will be understood that this embodiment works in a similar manner to the other embodiments previously described, and has the same advantages and features, and hence no further description thereof will be required.

Although the present invention has been shown and described with respect to some preferred embodiments thereof, it should be understood that various modifications and alterations of the form and the content thereof may be made by one skilled in the art without departing from the principles or the spirit of the invention.

I claim:

1. An exhaust gas recirculation control system for an engine which has an intake passage which incorporates a throttle valve, and an exhaust passage, comprising:
   an exhaust gas recirculation passage which joins between said exhaust passage and said intake passage;
   means to detect engine operating parameters;
   an exhaust gas recirculation flow control valve, provided at a middle portion of said exhaust gas recirculating passage, so as to control the cross-sectional area of said exhaust gas recirculation passage according to a control signal;
   a computing controller comprising a memory means which is adapted to store target values of a control parameter corresponding to opening amounts of said exhaust gas recirculation flow control valve which provide the most desirable amounts of exhaust gas recirculation under various engine operating conditions determined by combinations of said engine operating parameters, wherein said computing contoller computes the target value of said control parameter based upon said engine operating parameters and compares said target value with the actual value of said control parameter and based thereupon produces said control signal; and
   an auxiliary valve located in said exhaust gas recirculation passage which is linked with said throttle valve and controls the cross-sectional area of said exhaust gas recirculation passage in relation to the opening amount of said throttle valve.

2. An exhaust gas recirculation system as in claim 1, wherein said auxiliary valve is adapted to be substantially closed when the throttle valve is at its substantially closed position, and opens as the throttle valve opens, reaching its most open position when the throttle valve has reached its most open position.

3. An exhaust gas recirculation system as in claim 1 or claim 2, wherein said auxiliary valve is a flap butterfly valve located in the exhaust gas recirculation passage, and wherein said auxiliary valve is mechanically linked to the throttle valve so as to open and close along with it.

4. An exhaust gas recirculation system as in claim 1 or 2, wherein said exhaust gas recirculation flow control valve is a vacuum operated valve having a vacuum chamber, said system further comprising a changeover valve controlled by said computing controller so as selectively to connect said vacuum chamber to said intake passage or to atmosphere.

5. An exhaust gas recirculation system as in claim 1 or 2, wherein said computing controller comprises a clock pulse generating circuit and makes the comparison between the target and the actual values of said control parameter in synchronization with clock pulses generated by said clock pulse generating circuit.

* * * * *